US012145116B2

(12) United States Patent
Oota et al.

(10) Patent No.: US 12,145,116 B2
(45) Date of Patent: Nov. 19, 2024

(54) LIQUID CONTAINING GAS BUBBLES PRODUCTION APPARATUS

(71) Applicant: KYB CORPORATION, Tokyo (JP)

(72) Inventors: Akihisa Oota, Tokyo (JP); Eishin Noguchi, Tokyo (JP); Terumi Mori, Tokyo (JP)

(73) Assignee: KYB Corporation, Tokyo (JP)

( * ) Notice: Subject to any disclaimer, the term of this patent is extended or adjusted under 35 U.S.C. 154(b) by 476 days.

(21) Appl. No.: 17/594,050

(22) PCT Filed: Mar. 23, 2020

(86) PCT No.: PCT/JP2020/012726
§ 371 (c)(1),
(2) Date: Sep. 30, 2021

(87) PCT Pub. No.: WO2020/209042
PCT Pub. Date: Oct. 15, 2020

(65) Prior Publication Data
US 2022/0203312 A1 Jun. 30, 2022

(30) Foreign Application Priority Data
Apr. 12, 2019 (JP) ................................ 2019-076419

(51) Int. Cl.
*B01F 25/31* (2022.01)
*B01F 23/21* (2022.01)
(Continued)

(52) U.S. Cl.
CPC .......... *B01F 25/3121* (2022.01); *B01F 23/21* (2022.01); *B01F 23/231* (2022.01);
(Continued)

(58) Field of Classification Search
CPC ..... B01F 23/21; B01F 23/231; B01F 25/3121
See application file for complete search history.

(56) References Cited

U.S. PATENT DOCUMENTS

2010/0276820 A1 11/2010 Mogami et al.

FOREIGN PATENT DOCUMENTS

CN 107530650 A 1/2018
JP 2002-95942 A 4/2002
(Continued)

OTHER PUBLICATIONS

International Search Report dated Jun. 2, 2020 in International Application No. PCT/JP2020/012726.
(Continued)

*Primary Examiner* — Robert A Hopkins
(74) *Attorney, Agent, or Firm* — Saliwanchik, Lloyd & Eisenschenk

(57) ABSTRACT

A production apparatus for a liquid containing gas bubbles includes a casing, a pump unit, and a gas bubble-mixing unit. The casing is provided with a main flow channel for a liquid, the main flow channel having a liquid inflow port and a liquid outflow port. The pump unit is disposed in the main flow channel and pumps the liquid to the liquid outflow port from the liquid inflow port. The gas bubble-mixing unit includes a first choke portion that is disposed in the main flow channel and has an inner diameter decreased and a gas supply channel that supplies the first choke portion with a gas.

4 Claims, 9 Drawing Sheets

(51) Int. Cl.

| | |
|---|---|
| ***B01F 23/23*** | (2022.01) |
| ***B01F 23/231*** | (2022.01) |
| ***B01F 25/10*** | (2022.01) |
| ***B01F 25/312*** | (2022.01) |
| ***B01F 35/75*** | (2022.01) |
| ***F04C 2/356*** | (2006.01) |
| ***F04C 15/06*** | (2006.01) |
| *B01F 25/00* | (2022.01) |
| *B01F 101/39* | (2022.01) |

(52) U.S. Cl.
CPC .......... *B01F 25/10* (2022.01); *B01F 35/7544* (2022.01); *F04C 2/356* (2013.01); *F04C 15/06* (2013.01); *B01F 2025/913* (2022.01); *B01F 2101/39* (2022.01); *F04C 2240/30* (2013.01)

(56) References Cited

FOREIGN PATENT DOCUMENTS

| | | | | |
|---|---|---|---|---|
| JP | 2002-153741 | A | | 5/2002 |
| JP | 2002-317783 | A | | 10/2002 |
| JP | 2007-21343 | A | | 2/2007 |
| JP | 2013-215634 | A | | 10/2013 |
| JP | 2017094300 | A | * | 6/2017 |
| JP | 2017-189733 | A | | 10/2017 |

OTHER PUBLICATIONS

Office Action dated Sep. 21, 2022 in Japanese Application No. 2019-076419.

Office Action dated Feb. 10, 2023 in Chinese Application No. 202080023801.3.

* cited by examiner

LIQUID CONTAINING GAS BUBBLES PRODUCTION APPARATUS

CROSS-REFERENCE TO RELATED APPLICATIONS

This application is the U.S. national stage application of International Patent Application No. PCT/JP2020/012726, filed Mar. 23, 2020, which claims the benefit under 35 U.S.C. § 119 of Japanese Application No. 2019-076419, filed Apr. 12, 2019, the disclosures of each of which are incorporated herein by reference in their entirety.

TECHNICAL FIELD

The present invention relates to a production apparatus for a liquid containing gas bubbles that generates gas bubbles such as ultra-fine bubbles in a liquid.

BACKGROUND ART

In recent years, liquids containing gas bubbles, which are obtained by making liquids such as water contain fine gas bubbles, have been prevailed. The fine gas bubbles include ultra-fine bubbles (UFB) having a diameter of 1 μm or less, micro bubbles having a diameter of 10 μm or less, milli-bubbles having a diameter of 1 mm or less, and the like. In particular, UFB water containing UFB has been expected to be used in fields of freshness maintenance of fish and shellfish, microbial culture, sterilized medical care, various types of washing, and the like.

As an apparatus that generates fine gas bubbles, there is for example known an apparatus including a main flow channel through which a liquid flows and a gas supply channel for introducing a gas into the main flow channel, in which gas supply holes of the gas supply channel connected to an intake chamber of the main flow channel so as to form an angle with respect to the direction in which the liquid flows and are disposed so that the center axes of the gas supply holes and the center axis of the main flow channel do not intersect so as to generate a helical rotational flow in the main flow channel by the introduction of the gas (Patent Literature 1).

CITATION LIST

Patent Literature

Patent Literature 1: Japanese Patent Application Laid-open No. 2017-189733

DISCLOSURE OF INVENTION

Technical Problem

However, apparatuses with the above-mentioned configuration have limitations on refining gas bubbles and increasing the density of gas bubbles.

In view of the above-mentioned circumstances, it is an object of the present invention to provide a production apparatus for a liquid containing gas bubbles that is capable of generating fine gas bubbles with a high density.

Solution to Problem

In order to accomplish the above-mentioned object, a production apparatus for a liquid containing gas bubbles according to an embodiment of the present invention includes a casing, a pump unit, and a gas bubble-mixing unit.

The casing is provided with a main flow channel for a liquid, the main flow channel having a liquid inflow port and a liquid outflow port.

The pump unit is disposed in the main flow channel and pumps the liquid to the liquid outflow port from the liquid inflow port.

The gas bubble-mixing unit includes a first choke portion that is disposed in the main flow channel and has an inner diameter decreased and a gas supply channel that supplies the first choke portion with a gas.

With this configuration, the pump unit disposed in the main flow channel of the casing is capable of taking in a large amount of liquid. Therefore, the choke can sufficiently increase the flow velocity. Accordingly, a large amount of gas can be introduced and high-density gas bubbles can be generated.

The pump unit may include

- a rotor rotatably supported by the casing,
- a drive unit that rotates the rotor,
- a plurality of vanes provided capable of reciprocation in a radial direction of the rotor, and
- a cam ring having a cam surface with which leading end portions of the plurality of vanes are brought into contact due to the rotation of the rotor and attached to the casing to define a pump chamber with the rotor and the plurality of vanes,
- an inlet port that is in communication with the liquid inflow port and takes the liquid into the pump chamber, and
- an outlet port that is in communication with the liquid outflow port and discharges the liquid from the pump chamber.

Constituting the pump unit as a vane pump can increase the discharge pressure of the liquid while inhibiting operation failures due to mixing of the gas and the like. Moreover, the mechanism of the pump unit can be incorporated in the main flow channel. Accordingly, a saved space and a reduction in costs can be realized. In addition, the pump unit having high discharge pressure is capable of dissolving a gas in the liquid in a supersaturated state. Accordingly, the dissolved gas can be changed into gas bubbles again in the vicinity of the liquid outflow port where the pressure is released, and a high-density gas bubble-mixed liquid can be generated.

The production apparatus for a liquid containing gas bubbles may further include

- a flow velocity control unit that includes a second choke portion in which an inner diameter of the main flow channel is decreased, is disposed between the pump unit and the liquid outflow port, and controls flow velocity of the liquid containing the gas, in which
- the gas bubble-mixing unit may be disposed between the liquid inflow port and the pump unit.

In the flow velocity control unit, controlling to increase the flow velocity of the liquid containing the gas can lower the static pressure of the liquid, and the excessively dissolved gas can be changed into gas bubbles again in the pump unit. Moreover, increasing the flow velocity can add shearing force to the gas bubbles in the liquid, and the gas bubbles can be refined. In addition, lowering the static pressure can form cavities (cavitation) and can add shearing force to the gas bubbles also due to its energy, and the generated gas bubbles can be further refined. In other words, water vapor bubbles generated due to the cavitation disappear (collapse), and energy generated at that time can crush (refine) the surrounding gas changed into gas bubbles again. In addition, the gas can be easily introduced by disposing the gas bubble-mixing unit on an upstream side of the pump unit.

Moreover, the second choke portion may have a small-diameter portion in which the inner diameter of the main flow channel is extremely small, and an increased-diameter portion which is connected to the small-diameter portion and the liquid outflow port and in which the inner diameter of the main flow channel gradually increases.

Accordingly, the increased-diameter portion can gradually increase the static pressure of the liquid containing gas bubbles, and can cause the liquid containing gas bubbles to smoothly flow out of the liquid outflow port.

The gas bubble-mixing unit may include a rotational flow generation unit that is connected to the liquid inflow port and the first choke portion and generates, in the liquid, a rotational flow around an axis of the main flow channel.

Generating the rotational flow can further increase the dynamic pressure of the liquid and can lower the static pressure. Accordingly, the gas can be easily introduced.

MODE(S) FOR CARRYING OUT THE INVENTION

Hereinafter, each of embodiments of the present invention will be described.

First Embodiment

[Configuration of Production Apparatus for Liquid Containing Gas Bubbles]

Figure 1:
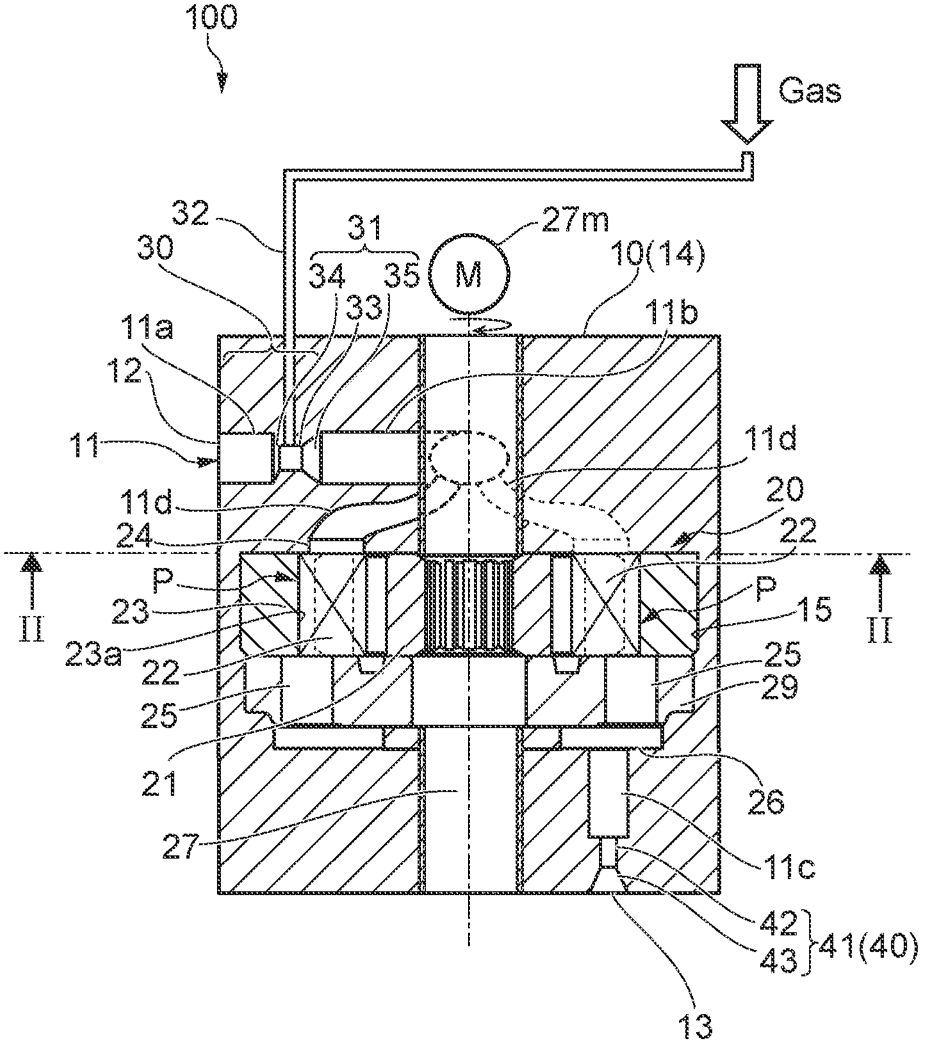
FIG. 1 A schematic vertical cross-sectional view showing a configuration of a production apparatus for a liquid containing gas bubbles according to a first embodiment of the present invention.

FIG. 1 is a schematic vertical cross-sectional view showing a configuration of a production apparatus 100 for a liquid containing gas bubbles according to this embodiment. The production apparatus 100 for a liquid containing gas bubbles is an apparatus that produces a liquid containing fine gas bubbles (hereinafter, a liquid containing gas bubbles). The gas bubbles includes, as to the kind, ultra-fine bubbles (UFB) having a diameter of 1 μm or less, micro bubbles having a diameter of 10 μm or less, milli-bubbles having a diameter of 1 mm or less, and the like, depending on the size. Although the gas bubbles that the liquid containing gas bubbles contains may have any size, the gas bubbles that the liquid containing gas bubbles contains are typically UFB.

A gas to form the gas bubbles is not particularly limited, and can be, for example, the air, nitrogen, oxygen, ozone, or the like. A liquid that constitutes the liquid containing gas bubbles is not particularly limited, and can be selected as appropriate depending on purposes. The application examples will be described later.

As shown in FIG. 1, the production apparatus 100 for a liquid containing gas bubbles includes a casing 10, a pump unit 20, a gas bubble-mixing unit 30, and a flow velocity control unit 40. As it will be described later in detail, the production apparatus 100 for a liquid containing gas bubbles has a configuration in which a vane pump is incorporated in the casing 10.

The casing 10 is provided with the main flow channel 11 for a liquid, the main flow channel 11 having a liquid inflow port 12 and a liquid outflow port 13. The positions of the liquid inflow port 12 and the liquid outflow port 13 are not limited to the example shown in the figure. As it will be described later, the casing 10 is configured to be capable of being immersed in a liquid. The casing 10 is made from a metal material such as aluminum and stainless, a resin material, or the like for inhibiting influences of rust, corrosion, and the like caused by a liquid, reducing the weight, and the like.

The casing 10 includes, for example, a main body 14 provided with the main flow channel 11 and a cover (not shown) that seals the main flow channel 11 of the main body 14. The main body 14 includes a pump-housing recess portion 15 that houses a pump mechanism of the pump unit 20 to be described later. The cover is fixed to the main body 14 through a plurality of bolts and the like, for example. The casing 10 is not limited to the above-mentioned configuration, and may be constituted by three or more members.

The pump unit 20 is disposed in the main flow channel 11 and pumps a liquid to the liquid outflow port 13 from the liquid inflow port 12. The pump unit 20 is configured as a vane pump, for example. The vane pump is a positive-displacement pump to be used for pumping a liquid. The vane pump is characterized in that it has a relatively simple configuration, includes vanes hard to be deformed and worn down, and can provide high discharge pressure. Accordingly, a liquid containing high-density gas bubbles can be obtained while inhibiting operation failures of the pump unit 20 due to the liquid containing gas bubbles.

Specifically, the pump unit 20 includes a rotor 21, a drive unit 27*m*, a plurality of vanes 22, a cam ring 23, an inlet port 24, an outlet port 25, and a high-pressure chamber 26.

The rotor 21 is rotatably supported by the casing 10. Specifically, the rotor 21 is coupled to a shaft 27 rotatably attached to the casing 10. The drive unit 27*m*, which is a motor or the like, is connected to an end portion of the shaft 27. The drive unit 27*m* is disposed outside the casing 10 and rotates the rotor 21 via the shaft 27. The rotor 21 is made from a metal material such as aluminum and stainless, a resin material, or the like for inhibiting influences of rust, corrosion, and the like caused by a liquid.

Figure 2:
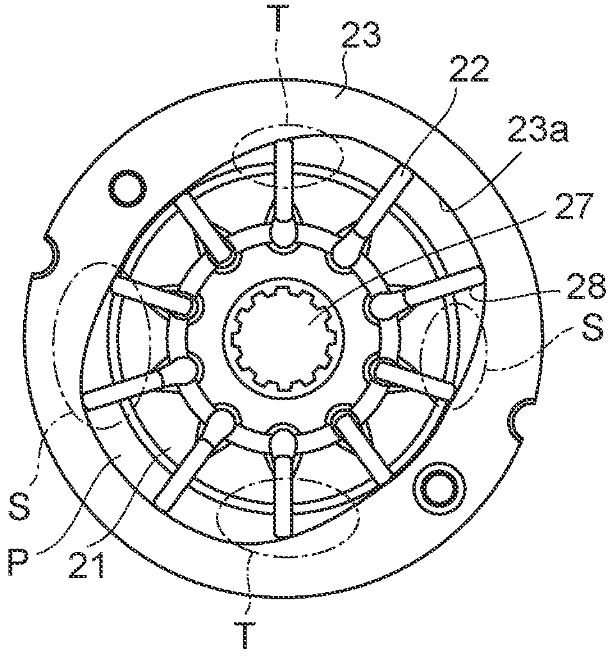
FIG. 2 A cross-sectional view taken along the line II-II of FIG. 1.

FIG. 2 is a diagram showing main parts of the pump unit 20 and is a cross-sectional view taken along the line II-II of FIG. 1.

The pump unit 20 in the figure is configured as a balanced vane pump in which the pressure in a radial direction related to the rotor 21 is balanced.

The plurality of vanes 22 is provided to be capable of reciprocation in the radial direction of the rotor 21. A plurality of slits 28 is formed in the rotor 21. The plurality of slits 28 has opened upper portions and is provided to be spaced apart from each other in the radial direction. Each vane 22 is configured to have a rectangular plate shape and is slidably inserted into each slit 28. The vane 22 is made from a resin material or a metal material such as aluminum and stainless, for example.

The cam ring 23 has a cam surface 23*a*. The cam surface 23*a*. Leading end portions of the plurality of vanes 22 are brought into contact with the cam surface 23*a* due to the rotation of the rotor 21. The cam ring 23 is an annular member. The cam surface 23*a* of the cam ring 23 has an approximately oval shape. The cam ring 23 is attached to the casing 10 and defines a plurality of pump chambers P with the rotor 21 and the plurality of vanes 22. The cam ring 23 is also made from a metal material such as aluminum and stainless, a resin material, or the like for inhibiting influences of rust, corrosion, and the like caused by a liquid.

The vanes 22 rotate with the leading end portions held in slidable contact with the cam surface 23*a* due to the rotation of the rotor 21. Accordingly, the capacity of the pump chamber P between the respective vanes 22 varies, which enables a liquid to be taken in and discharged. In this embodiment, the cam ring 23 includes two intake regions S and two discharge regions T.

The outlet port 25 is a port for discharging a liquid from the pump chambers P in the discharge regions T. The outlet port 25 is in communication with the liquid outflow port 13 via the flow velocity control unit 40 to be described later. The outlet port 25 is, for example, provided in a side plate 29 disposed in the pump-housing recess portion 15 to be adjacent to the cam ring 23. In this embodiment, two outlet ports 25 are provided corresponding to the two discharge regions T. The outlet ports 25 are connected to the high-pressure chamber 26. The high-pressure chamber 26 is provided in the bottom portion of the pump-housing recess portion 15. The high-pressure chamber 26 is formed in a ring shape, for example.

The inlet port 24 is a port for taking a liquid into the pump chambers P in the intake regions S. The inlet port 24 is in communication with the liquid inflow port 12 via the gas bubble-mixing unit 30 to be described later. Also, two inlet ports 24 are provided corresponding to the two intake regions S, for example. These inlet ports 24 are respectively connected to flow branching channels 11*d*. The flow branching channels 11*d* are flow channels for branching a liquid from the main flow channel 11 on the side of the liquid inflow port 12 and leading the branched flows to the two inlet ports 24 of the pump unit 20.

As shown in FIG. 1, the gas bubble-mixing unit 30 on an upstream side of the pump unit 20 is disposed in the main flow channel 11 and introduces a gas (gas bubbles) into a liquid. In this embodiment, the gas bubble-mixing unit 30 is disposed between the liquid inflow port 12 and the pump unit 20, more specifically, between the liquid inflow port 12 and the flow branching channels 11*d*.

The gas bubble-mixing unit 30 includes a first choke portion 31 and a gas supply channel 32. The first choke portion 31 is disposed in the main flow channel 11 and has an inner diameter decreased. The gas supply channel 32 supplies the first choke portion 31 with a gas. The gas bubble-mixing unit 30 is connected to the liquid inflow port 12 via a first flow channel 11*a* of the main flow channel 11 and is connected to the pump unit 20 via a second flow channel 11*b* of the main flow channel 11 and the flow branching channels 11*d*.

The first choke portion 31 is, for example, configured as a Venturi tube. Specifically, the first choke portion 31 has a first small-diameter portion 33 having an inner diameter extremely small, a decreased-diameter portion 34 connected to an upstream side of the first small-diameter portion 33, and a first increased-diameter portion 35 connected to a downstream side of the first small-diameter portion 33. The decreased-diameter portion 34 is a portion whose inner diameter gradually decreases toward the first small-diameter portion 33 from the first flow channel 11*a*. The first increased-diameter portion 35 is a portion whose inner diameter gradually increases toward the second flow channel 11*b* from the first small-diameter portion 33.

The gas supply channel 32 is a pipe for introducing a gas into the first choke portion 31 from a gas source (not shown). The gas supply channel 32 is, for example, connected to the first small-diameter portion 33 of the first choke portion 31. The connection structure between the gas supply channel 32 and the first choke portion 31 is not particularly limited. For example, the gas supply channel 32 may be connected to intersect with the center axis of the first choke portion 31 substantially perpendicularly or may be connected to form an acute angle with respect to that center axis. Alternatively, the gas supply channel 32 may be connected to the first increased-diameter portion 35.

As shown in FIG. 1, the flow velocity control unit 40 is disposed between the pump unit 20 and the liquid outflow port 13. The flow velocity control unit 40 controls the flow velocity of the liquid containing the gas to generate minute gas bubbles (e.g., UFB) in the liquid. The flow velocity control unit 40 is, in this embodiment, connected to the high-pressure chamber 26 via a third flow channel 11*c*.

The flow velocity control unit 40 includes a second choke portion 41 in which the inner diameter of the main flow channel 11 is decreased. The second choke portion 41 has a second small-diameter portion 42 having an inner diameter extremely small and a second increased-diameter portion 43 having an inner diameter that gradually increases toward the liquid outflow port 13 from the second small-diameter portion 42. The second increased-diameter portion 43 is, for example, configured to have a truncated cone shape and functions as a diffuser that leads the liquid containing gas bubbles into the liquid outflow port 13 while gradually increasing the static pressure.

The production apparatus 100 for a liquid containing gas bubbles having the above-mentioned configuration is, for example, configured to be capable of being attached to a tank in which a liquid is reserved or the like.

[Configuration of Reservation Container for Liquid Containing Gas Bubbles]

Figure 3:
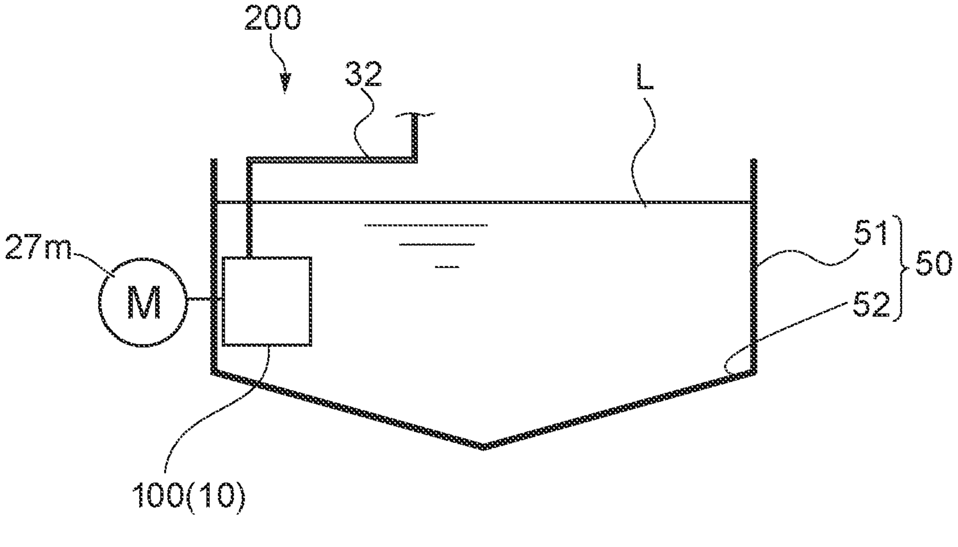
FIG. 3 A schematic diagram showing a configuration of a reservation container for a liquid containing gas bubbles according to the first embodiment of the present invention.

FIG. 3 is a schematic diagram showing a configuration of a reservation container 200 for a liquid containing gas bubbles according to this embodiment.

The reservation container 200 for a liquid containing gas bubbles is configured as a container including a storage unit 50 capable of storing a liquid L and the production apparatus 100 for a liquid containing gas bubbles, which is disposed in the storage unit 50, the production apparatus 100 for a liquid containing gas bubbles being built therein.

The storage unit 50 is, for example, a tank or the like having a wall portion 51 and a bottom portion 52 and capable of reserving the liquid L.

The production apparatus 100 for a liquid containing gas bubbles includes, for example, an attachment portion (not shown) for attaching the casing 10 to the storage unit 50 and is attached to an inner surface of the wall portion 51 of the storage unit 50. In this embodiment, the production apparatus 100 for a liquid containing gas bubbles is configured such that the entire casing 10 including the liquid inflow port 12 and the liquid outflow port 13 is capable of being immersed in the liquid L of the storage unit 50. In this case, the gas supply channel 32 of the gas bubble-mixing unit 30 extends outside the storage unit 50 from the casing 10 and is connected to the gas source (not shown). Moreover, the drive unit 27*m* of the pump unit 20 is typically disposed outside the storage unit 50. The present invention is not limited thereto, and the drive unit 27*m* may be configured to be capable of being immersed in the liquid L with the casing 10.

An input operation unit (not shown) of the production apparatus 100 for a liquid containing gas bubbles may be provided in an outer surface of the wall portion 51 of the storage unit 50. Accordingly, user's input operations of, e.g., activating and disactivating the production apparatus 100 for a liquid containing gas bubbles can be performed.

In the reservation container 200 for a liquid containing gas bubbles, the production apparatus 100 for a liquid containing gas bubbles is capable of taking in the liquid L of the storage unit 50, generating a liquid containing high-density minute gas bubbles, and discharging the liquid containing high-density minute gas bubbles into the liquid L of the storage unit 50. In addition, passing of the liquid L through the production apparatus 100 for a liquid containing gas bubbles plural times can increase the density of minute gas bubbles of the liquid in the storage unit 50.

[Operations and Actions of Reservation Container for Liquid containing gas bubbles (Production Apparatus for Liquid Containing Gas Bubbles)]

Hereinafter, operations and actions of the reservation container 200 for a liquid containing gas bubbles and the production apparatus 100 for a liquid containing gas bubbles having the above-mentioned configurations will be described. It is assumed that the liquid L is stored in the storage unit 50 of the reservation container 200 for a liquid containing gas bubbles so that the entire casing 10 of the production apparatus 100 for a liquid containing gas bubbles is immersed therein.

First of all, the drive unit 27*m* connected to the pump unit 20 is activated and the rotor 21 rotates. Accordingly, the vanes 22 provided in the rotor 21 slide on the cam surface 23*a*. The capacity of the pump chambers P defined by the vanes 22 adjacent to each other near the inlet ports 24 increases, so that a liquid is taken into the pump chambers P via the liquid inflow port 12 and the gas bubble-mixing unit 30.

Figure 4:
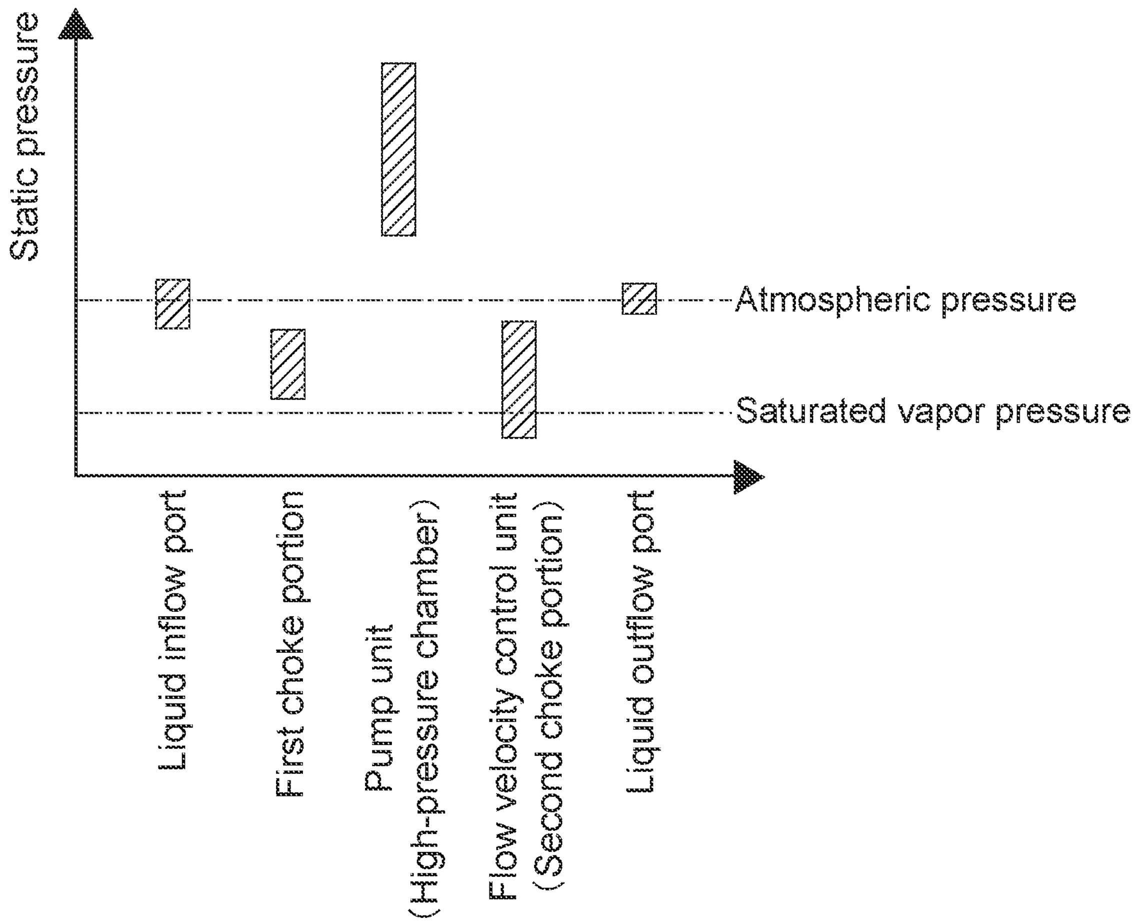
FIG. 4 A schematic graph showing an example of a static-pressure distribution of a liquid at each site in a main flow channel of the production apparatus for a liquid containing gas bubbles.

FIG. 4 is a schematic graph illustrating a static-pressure distribution of a liquid at each site in the main flow channel 11 and shows an example of a range of static pressures that the liquid can have at each site. The long dashed short dashed line denotes an atmospheric pressure and the long dashed double-short dashed line denotes a saturated vapor pressure of a gas in the liquid.

The liquid flowing in from the liquid inflow port 12 flows into the first choke portion 31 through the first flow channel 11*a*. At the first choke portion 31, the static pressure lowers and a negative pressure is generated as shown in FIG. 4 along with an increase in flow velocity due to the Venturi effect. Accordingly, the gas is taken in from the gas supply channel 32 and gas bubbles are mixed in the liquid.

Moreover, the rapid change in flow velocity at the first choke portion 31 generates shearing force in the liquid, and gas bubbles can be generated and refined.

The liquid containing gas bubbles that is taken into the pump chambers P is increased in pressure due to increase and decrease in the capacity of the pump chambers P. In the pump unit 20, the pump chambers P may be hermetically sealed for a certain time to perform pre-compression when the intake process shifts to the discharge process.

After it is increased in pressure, the liquid containing gas bubbles is discharged from the outlet ports 25 and stored in the high-pressure chamber 26. As shown in FIG. 4, in the high-pressure chamber 26, the liquid containing gas bubbles is increased in pressure and has a higher static pressure. In this embodiment, the pressure of the high-pressure chamber 26 (the discharge pressure of the pump unit 20) is, for example, 5 MPa or more. Therefore, in the high-pressure chamber 26, the solubility of the gas is increased and the gas is dissolved in the liquid in a supersaturated state.

The second choke portion 41 of the flow velocity control unit 40 maintains the liquid containing gas bubbles in the higher static pressure state in the area from the outlet ports 25 to the third flow channel 11*c*.

When the liquid containing gas bubbles in the pressure-increased state flows into the second choke portion 41 of the flow velocity control unit 40, the flow velocity increases and the static pressure rapidly lowers due to the Venturi effect. Accordingly, as shown in FIG. 4, the static pressure of the liquid becomes equal to or lower than the atmospheric pressure and the gas dissolved in the supersaturated state is changed into gas bubbles again by the action of the pump unit.

In addition, the liquid increased in the flow velocity produces a jet stream toward the second increased-diameter portion 43 from the second choke portion 41. With this shearing force, the gas bubbles are further crushed and refined. Accordingly, ultra-fine bubbles with a higher density are generated.

In addition, when the static pressure of the liquid becomes equal to or lower than the saturated vapor pressure of the gas due to the second choke portion 41, cavities are formed using the gas bubbles in the liquid as their cores (cavitation). That is, a large number of minute gas bubbles are generated due to boiling of the liquid, liberation of the dissolved gas, and the like. Water vapor bubbles generated due to the cavitation rapidly disappear (collapse), and the surrounding gas changed into the gas bubbles again is crushed (refined) due to energy generated at that time. Accordingly, ultra-fine bubbles with a much higher density are generated.

Adjusting the inner diameter of the second choke portion 41 of the flow velocity control unit 40 can control the flow velocity and the static pressure of the liquid and can control the size of the gas bubbles. Specifically, as the ratio of the diameter of the second choke portion 41 to the third flow channel 11*c* becomes smaller, the flow velocity can be increased and the static pressure can be lowered, so that the gas bubbles can be further refined.

The generated liquid containing gas bubbles is ejected to the liquid outflow port 13 from the second increased-diameter portion 43. Accordingly, the liquid L in the storage unit 50 is changed into the liquid containing gas bubbles and the liquid containing gas bubbles is reserved in the storage unit 50, so that the liquid containing gas bubbles can be used.

Actions and Effects of this Embodiment

In the above-mentioned manner, in the production apparatus 100 for a liquid containing gas bubbles according to this embodiment, the pump unit 20 can take in and pump the liquid. Accordingly, the flow velocity can be sufficiently increased at the first choke portion 31 and a large amount of gas can be supplied into the liquid. Moreover, since the gas bubble-mixing unit 30 includes the first choke portion 31, the gas can be efficiently taken in with a simple configuration.

By disposing the gas bubble-mixing unit 30 on the upstream side of the pump unit 20, the negative pressure is easily generated to make the intake of the gas easy and the liquid containing gas bubbles after gas bubbles are mixed therein can be increased in pressure through the pump unit 20. Accordingly, the gas can be dissolved in the liquid in a supersaturated state. Then, by lowering the static pressure to be equal to or lower than the atmospheric pressure in the flow velocity control unit 40, the excessively dissolved gas can be changed into gas bubbles again. Also, in the flow velocity control unit 40, a jet stream can be generated and the gas bubbles can be sufficiently refined due to its impact. In addition, by rapidly lowering the static pressure of the liquid to be equal to or lower than the saturated vapor pressure, cavities are formed (cavitation) and the gas bubbles are further refined, and a liquid containing high-density gas bubbles can be generated. In other words, water vapor bubbles generated due to the cavitation disappear (collapse), and the surrounding gas changed into the gas bubbles again can be crushed (refined) due to energy generated at that time.

Moreover, since the pump unit 20 is configured as the vane pump, the production apparatus 100 for a liquid containing gas bubbles that has a structure with which corrosion, damage, and operation failures due to the liquid containing gas bubbles are unlikely to occur is realized. Moreover, the pump unit 20 is capable of increasing the discharge pressure to be equal to or higher than 5 MPa for example, which can reliably lead to refinement of cavities and gas bubbles.

In addition, the production apparatus 100 for a liquid containing gas bubbles can be manufactured on the basis of the vane pump's structure, and the number of components such as pipings can be reduced. Accordingly, the production costs of the production apparatus 100 for a liquid containing gas bubbles can be reduced and the apparatus can be downsized. In addition, the production apparatus 100 for a liquid containing gas bubbles has a configuration easy to handle and maintain.

In addition, regarding the reservation container 200 for a liquid containing gas bubbles, the casing 10 of the production apparatus 100 for a liquid containing gas bubbles can be disposed inside the storage unit 50. Accordingly, a piping for connecting the storage unit 50 that is a tank or the like to the production apparatus 100 for a liquid containing gas bubbles also becomes unnecessary, and the production costs can be reduced. Moreover, the reservation container 200 for a liquid containing gas bubbles can be configured in a saved space.

Second Embodiment

A production apparatus 100A for a liquid containing gas bubbles may be configured such that a gas bubble-mixing unit 30A produces a rotational flow in addition to the configuration of the first embodiment. In the following description, configurations similar to those of the first embodiment will be denoted by similar reference signs and descriptions thereof will be omitted.

Figure 5:
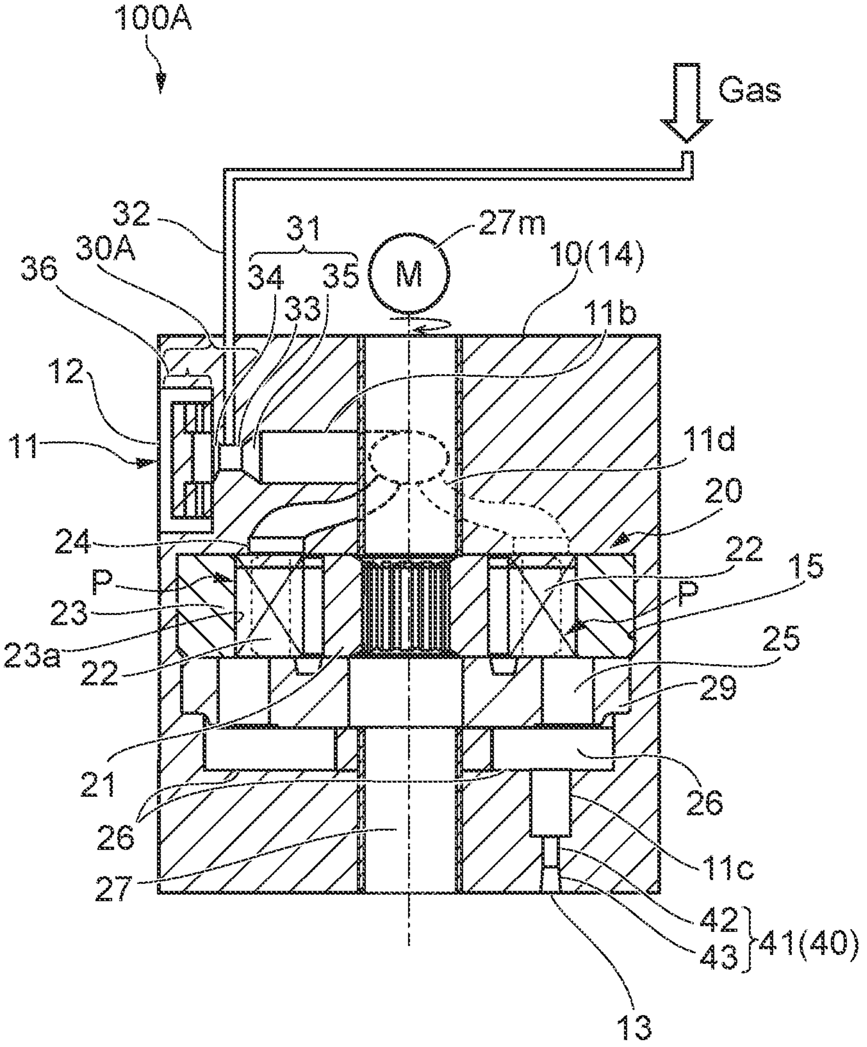
FIG. 5 A schematic vertical cross-sectional view showing a configuration of a production apparatus for a liquid containing gas bubbles according to a second embodiment of the present invention.

FIG. 5 is a schematic vertical cross-sectional view showing a configuration of the production apparatus 100A for a liquid containing gas bubbles according to this embodiment.

The production apparatus 100A for a liquid containing gas bubbles includes a casing 10, a pump unit 20, and a flow velocity control unit 40 that have configurations of similar to those of the first embodiment and includes a gas bubble-mixing unit 30A having a configuration different from that of the first embodiment.

In this embodiment, the gas bubble-mixing unit 30A includes a first choke portion 31 in which the inner diameter of the main flow channel 11 is decreased and a gas supply channel 32 and further includes a rotational flow generation unit 36.

Figure 6:
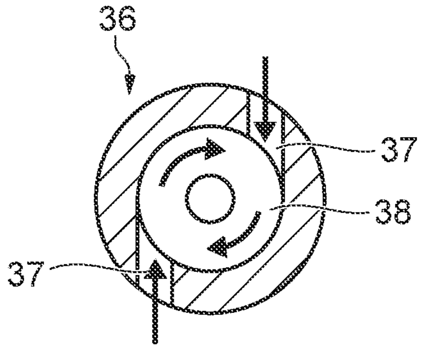
FIG. 6 A schematic diagram showing a configuration of a rotational flow generation unit of the production apparatus for a liquid containing gas bubbles.

FIG. 6 is a diagram showing a configuration of the rotational flow generation unit 36 and is a schematic cross-sectional view in a center-axis direction of the main flow channel 11.

The rotational flow generation unit 36 includes a rotation introduction channel 37 and a rotation flow channel 38.

The rotation introduction channel 37 is connected to a liquid inflow port 12 and the rotation flow channel 38 in the casing 10. The rotation introduction channel 37 is formed to be connected to a tangent-line direction of the rotation flow channel 38. A plurality of rotation introduction channels 37 is formed, for example, as shown in FIG. 6.

The rotation flow channel 38 is a flow channel provided to extend around the center axis of the main flow channel 11. The length of the rotation flow channel 38 is not particularly limited, and is configured to rotate around the axis one or several times.

As in the first embodiment, the first choke portion 31 includes a first small-diameter portion 33 having an inner diameter extremely small, a first decreased-diameter portion 34 connected to an upstream side of the first small-diameter portion 33, and a first increased-diameter portion 35 connected to a downstream side of the first small-diameter portion 33. The first decreased-diameter portion 34 is connected to a downstream side of the rotation flow channel 38 of the rotational flow generation unit 36.

With such a configuration, a rotational flow is produced on an upstream side of the first choke portion 31, and the flow velocity of the liquid increases. Accordingly, at the first choke portion 31, the static pressure can be greatly lowered. Therefore, a high negative pressure can be generated at the first choke portion 31, and the amount of intake of the gas from the gas supply channel 32 can be increased.

In addition, the inner diameter gradually decreases in the first decreased-diameter portion 34, and therefore the rotation velocity of the rotational flow can be increased and the amount of intake of the gas can be further increased.

In addition, in the first choke portion 31, the liquid rotates at the outer periphery due to the centrifugal force of the rotational flow and the gas is suctioned toward the center portion where the negative pressure is higher from the outer periphery. Accordingly, strong shearing force acts on gas bubbles in the liquid, the refinement of gas bubbles is promoted, and UFB can be efficiently produced.

As described above, in accordance with this embodiment, a larger amount of gas can be mixed in a liquid and gas bubbles with a higher density can be generated in the flow velocity control unit.

Third Embodiment

The configuration of the rotational flow generation unit 36 is not limited to the configuration shown in FIG. 6.

Figure 7:
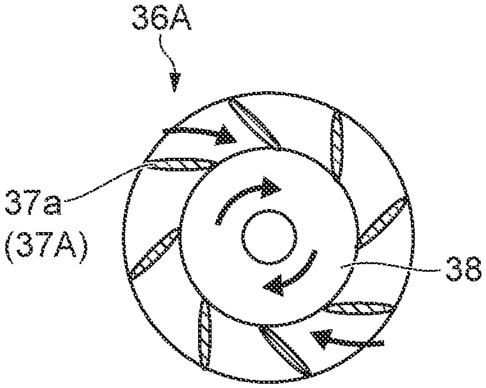
FIG. 7 A schematic diagram showing a configuration example of a rotational flow generation unit according to a third embodiment of the present invention.

For example, as shown in FIG. 7, a rotation introduction channel 37A of a rotational flow generation unit 36A may include a guide 37*a* having a helical projection. Accordingly, a rotational flow having higher flow velocity can be produced in the rotation flow channel 38.

Figure 8:
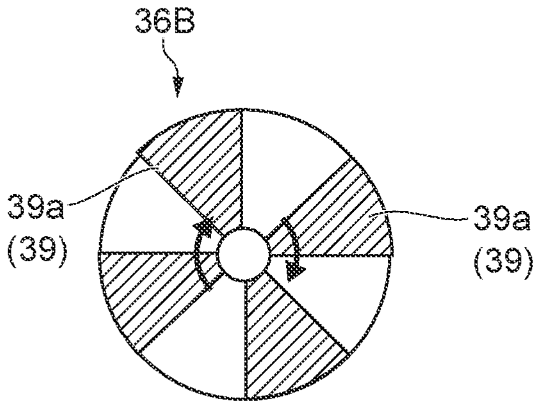
FIG. 8 A schematic diagram showing another configuration example of the rotational flow generation unit according to the third embodiment of the present invention.

Moreover, as shown in FIG. 8, a rotational flow generation unit 36B may include guide blades 39 provided on an upstream side of the first choke portion 31 in the main flow channel 11. The guide blades 39 have a plurality of blade-like projections 39*a* extending radially from the center axis of the main flow channel 11 and are configured to be rotatable around the center axis. Accordingly, a rotational flow can be produced on the upstream side of the first choke portion 31.

Fourth Embodiment

In a production apparatus 100B for a liquid containing gas bubbles, a gas bubble-mixing unit 30B may be disposed at the downstream of the pump unit 20. In the following description, configurations similar to those of the above-mentioned embodiments will be denoted by the same reference signs and the descriptions will be omitted.

Figure 9:
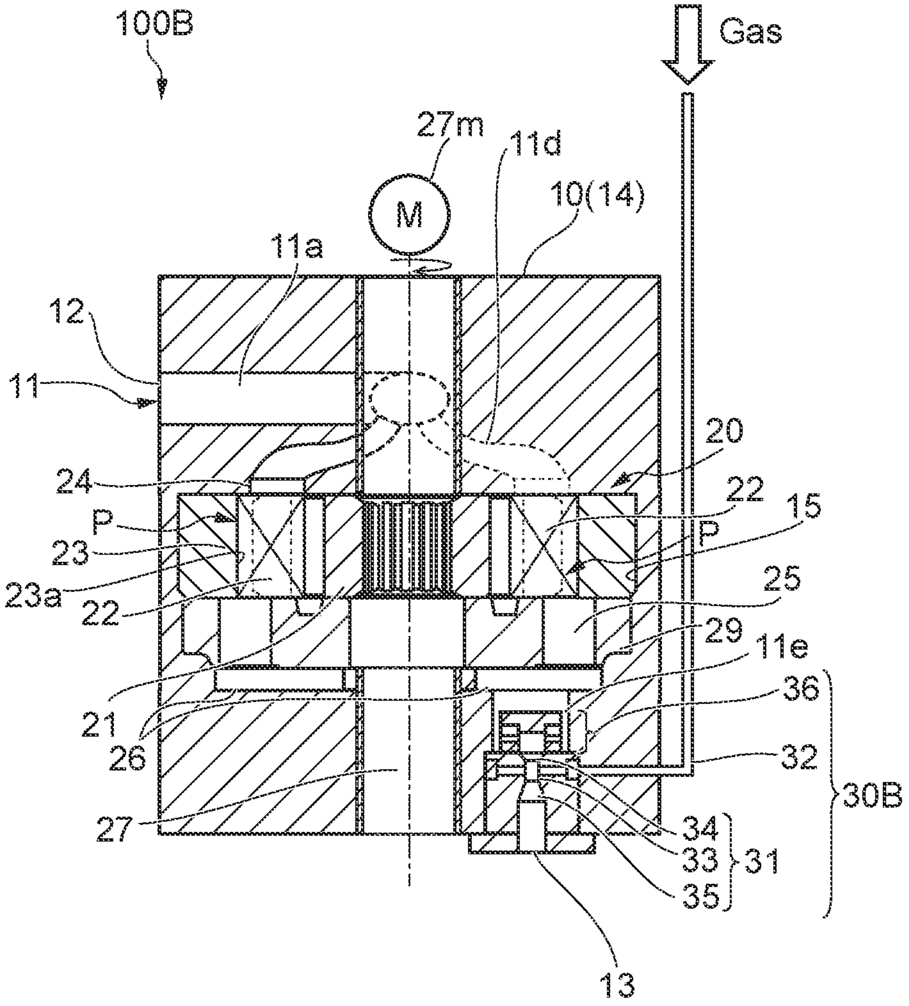
FIG. 9 A schematic vertical cross-sectional view showing a configuration of a production apparatus for a liquid containing gas bubbles according to a fourth embodiment of the present invention.

FIG. 9 is a schematic vertical cross-sectional view showing a configuration of the production apparatus 100B for a liquid containing gas bubbles according to this embodiment.

The production apparatus 100B for a liquid containing gas bubbles includes a casing 10 and a pump unit 20 that have configurations of similar to those of the first embodiment and includes a gas bubble-mixing unit 30B having a configuration different from that of the first embodiment.

The gas bubble-mixing unit 30B is disposed between the pump unit 20 and the liquid outflow port 13. The pump unit 20 is connected to a liquid inflow port 12 via a first flow channel 11*a* and a flow branching channels 11*d*.

The gas bubble-mixing unit 30B includes a rotational flow generation unit 36, a first choke portion 31, and a gas supply channel 32 connected to the first choke portion 31.

As in the second embodiment, the rotational flow generation unit 36 includes a rotation introduction channel 37 and a rotation flow channel 38. In this embodiment, the rotation introduction channel 37 introduces a liquid from a second flow channel 11*e* connected to a high-pressure chamber 26 of the pump unit 20. The rotation flow channel 38 is provided to extend around the center axis of the main flow channel 11.

The rotation flow channel 38 is connected to the first choke portion 31 to which the gas supply channel 32 is opened. The connection structure between the first choke portion 31 and the gas supply channel 32 is not limited. For example, the gas supply channel 32 may be provided in a ring shape to extend around the outer edge of the first choke portion 31 and a plurality of pipe channels may extend to the first choke portion 31 from the ring-shaped portion. Accordingly, the gas introduction efficiency can be improved.

In the gas bubble-mixing unit 30B, the liquid with the static pressure lowered and the gas are mixed at the first choke portion 31, the static pressure rapidly lowers to be equal to or lower than the saturated vapor pressure, and cavities are formed (cavitation). Accordingly, minute gas bubbles are generated.

Moreover, the first choke portion 31 is connected to the rotational flow generation unit 36. Therefore, the liquid in the first choke portion 31 forms a rotational flow. Accordingly, the negative pressure can be further increased and the gas can be efficiently taken in.

In addition, the liquid rotates at the outer periphery due to the centrifugal force of the rotational flow and the gas is suctioned toward the center portion where the negative pressure is higher from the outer periphery. Accordingly, strong shearing force acts on gas bubbles in the liquid, the refinement of gas bubbles is promoted, and UFB can be efficiently produced.

Fifth Embodiment

A production apparatus 100C for a liquid containing gas bubbles may include two gas bubble-mixing units 30C and 30D at the upstream and downstream of the pump unit. In the following description, configurations similar to those of the above-mentioned embodiments will be denoted by the same reference signs and the descriptions will be omitted.

Figure 10:
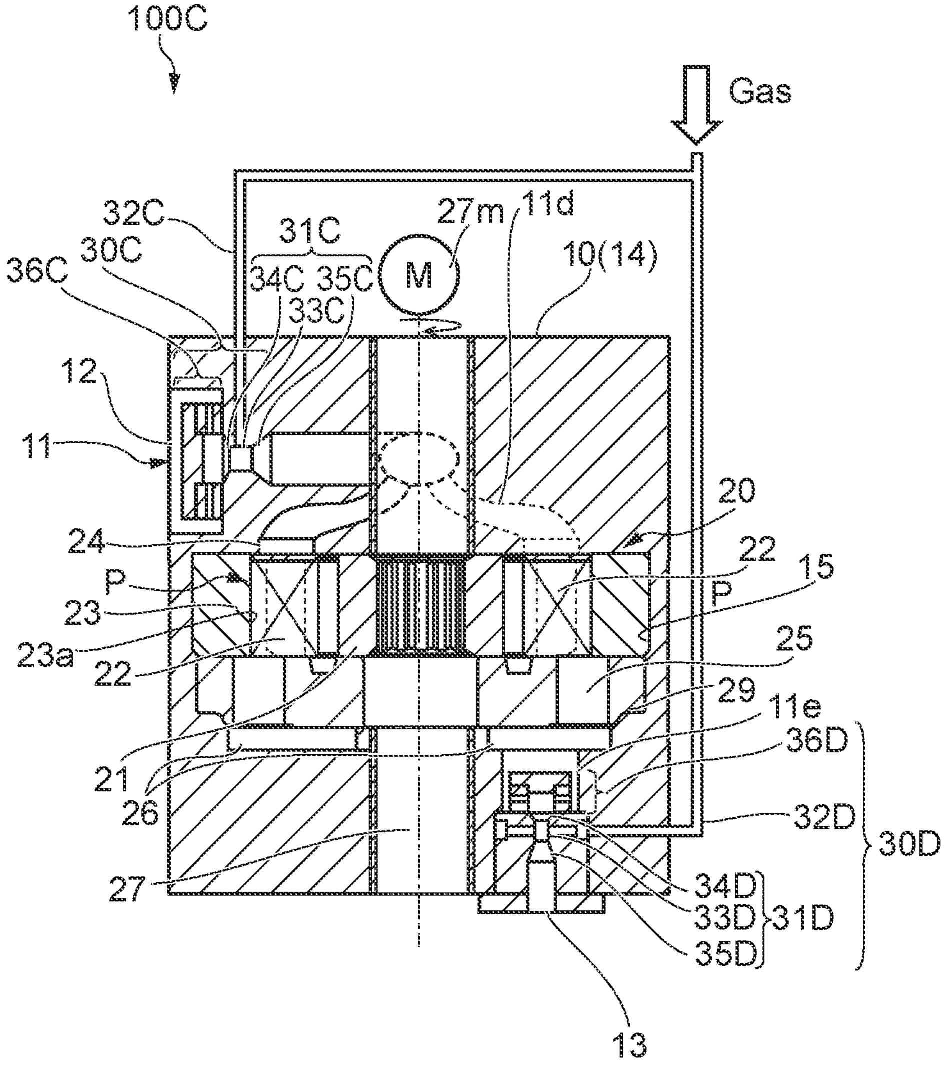
FIG. 10 A schematic vertical cross-sectional view showing a configuration of a production apparatus for a liquid containing gas bubbles according to a fifth embodiment of the present invention.

FIG. 10 is a schematic vertical cross-sectional view showing a configuration of the production apparatus 100C for a liquid containing gas bubbles according to this embodiment.

The production apparatus 100C for a liquid containing gas bubbles includes a casing 10 and a pump unit 20 that have configurations of similar to those of the first embodiment. The production apparatus 100C for a liquid containing gas bubbles further includes the first gas bubble-mixing unit 30C at the upstream of the pump unit 20 and the second gas bubble-mixing unit 30D at the downstream of the pump unit 20.

The first gas bubble-mixing unit 30C is disposed between the liquid inflow port 12 and the pump unit 20.

Like the gas bubble-mixing unit 30A according to the second embodiment, the first gas bubble-mixing unit 30C includes a first rotational flow generation unit 36C, a first choke portion 31C, and a first gas supply channel 32C connected to the first choke portion 31C.

The first rotational flow generation unit 36C is connected to a liquid inflow port 12.

The first choke portion 31C includes a first small-diameter portion 33C having an inner diameter extremely small, a first decreased-diameter portion 34C connected to an upstream side of the first small-diameter portion 33C, and a first increased-diameter portion 35C connected to a downstream side of the first small-diameter portion 33C. The first decreased-diameter portion 34C is connected to the first rotational flow generation unit 36C.

The first gas supply channel 32C is connected to the first small-diameter portion 33C, for example.

The second gas bubble-mixing unit 30D is disposed between the pump unit 20 and the liquid outflow port 13.

Like the gas bubble-mixing unit 30B according to the third embodiment, the second gas bubble-mixing unit 30D includes a second rotational flow generation unit 36D, a second choke portion 31D, and a second gas supply channel 32D connected to the second choke portion 31D.

The second rotational flow generation unit 36D is connected to a high-pressure chamber 26 of the pump unit 20.

The second choke portion 31D includes a second small-diameter portion 33D having an inner diameter extremely small, a second decreased-diameter portion 34D connected to an upstream side of the second small-diameter portion 33D, and a second increased-diameter portion 35D connected to a downstream side of the second small-diameter portion 42. The second decreased-diameter portion 34D is connected to the second rotational flow generation unit 36D and the second increased-diameter portion 35D is connected to the liquid outflow port 13.

The second gas supply channel 32D is connected to the second small-diameter portion 33D, for example.

With such a configuration, gas bubbles are introduced through the first gas bubble-mixing unit 30C and the liquid containing gas bubbles is pumped through the pump unit 20, and then gas bubbles can be additionally introduced through the second gas bubble-mixing unit 30D. Therefore, gas bubbles with a higher density can be generated.

Sixth Embodiment

The production apparatuses 100, 100A, 100B, and 100C for a liquid containing gas bubbles and the reservation container 200 for a liquid containing gas bubbles which have been described in the first to fifth embodiments can be used the following supply systems 300 for a liquid containing gas bubbles, for example. It should be noted that hereinafter, the description has been made by taking an example in which the supply system 300 for a liquid containing gas bubbles includes the production apparatus 100 for a liquid containing gas bubbles, though the supply system 300 for a liquid containing gas bubbles may include the production apparatus 100A, 100B, or 100C for a liquid containing gas bubbles.

Figure 11:
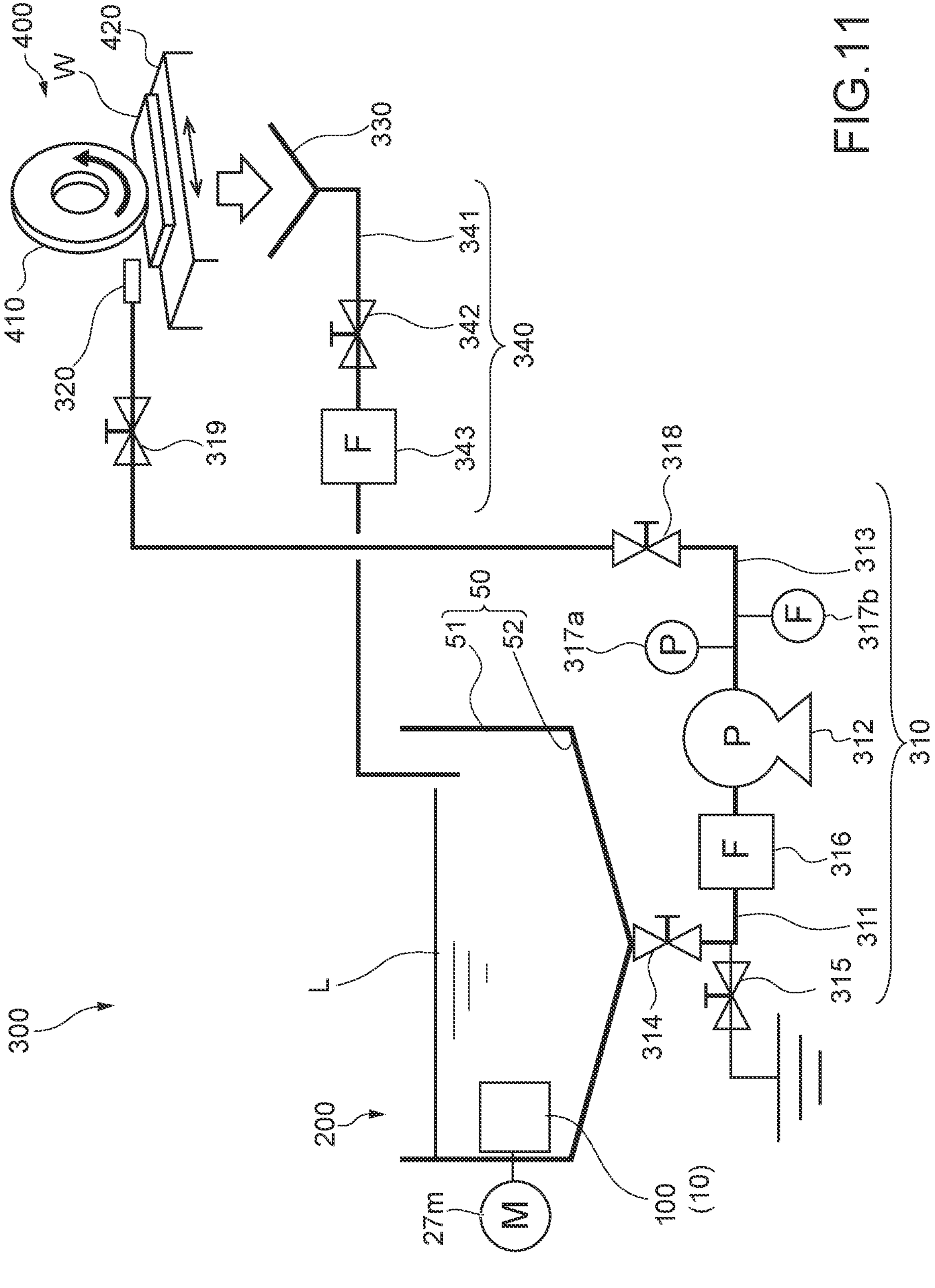
FIG. 11 A schematic diagram showing a configuration of a supply system for a liquid containing gas bubbles according to a sixth embodiment of the present invention.

FIG. 11 is a schematic diagram showing an example of the supply system 300 for a liquid containing gas bubbles. The supply system 300 for a liquid containing gas bubbles is configured as a grinding lubricant supply system that supplies a grinding lubricant (coolant fluid) to be used for a grinding apparatus. The liquid containing gas bubbles according to this embodiment is a fluid to be used for grinding that contains minute gas bubbles such as UFB. Hereinafter, it will be also referred to as a grinding lubricant containing gas bubbles.

The minute gas bubbles such as UFB have a surface-active effect and a microbiostatic effect with respect to causative substances of contamination of the grinding lubricant, a suppression effect of the odor of the grinding lubricant, and the like. Moreover, the grinding lubricant containing gas bubbles enables prevention of clogging with a grinding powder during a grinding process, reduction of the replacement frequency of a tool such as a grindstone, quality improvement of a product to be worked, and the like.

The supply system 300 for a liquid containing gas bubbles includes the reservation container 200 for a liquid containing gas bubbles, a liquid supplying line 310, a liquid supplying unit 320, a waste-liquid collecting unit 330, and a waste-liquid collecting line 340.

The reservation container 200 for a liquid containing gas bubbles includes the storage unit 50 and a production apparatus 100 for a liquid containing gas bubbles. The storage unit 50 is capable of storing a liquid L (grinding lubricant containing gas bubbles). The production apparatus 100 for a liquid containing gas bubbles is placed inside the storage unit 50. The storage unit 50 has, for example, a wall portion 51 and a bottom portion 52. The storage unit 50 is configured as a reservoir tank capable of reserving the grinding lubricant L containing gas bubbles. As described above, the casing 10 of the production apparatus 100 for a liquid containing gas bubbles is attached to the inner surface of the wall portion of the storage unit 50.

The liquid supplying line 310 has, for example, a first piping 311, a liquid feed pump 312, and a second piping 313.

The first piping 611 connects the reservation container 200 for a liquid containing gas bubbles to the liquid feed pump 612. In the example of FIG. 11, the first piping 611 is connected to the bottom portion 52 of the storage unit 50. A liquid supply valve 314, a liquid discharge valve 315, and a filter 316 are connected to the first piping 311. The filter 316 is used for removing impurities from the grinding lubricant L containing gas bubbles that is flowing through the first piping 311.

The liquid feed pump 312 is connected to the first piping 311 and the second piping 313. The liquid feed pump 312 feeds the grinding lubricant L containing gas bubbles, which is supplied from the reservation container 200 for a liquid containing gas bubbles via the first piping 311, into the second piping 313.

For example, a pressure gauge 317*a*, a flowmeter 317*b*, and a pressure/flow rate adjustment valve 318, a liquid supplying valve 319 are connected to the second piping 313. The pressure/flow rate adjustment valve 318 adjusts the pressure and the flow rate of the grinding lubricant L containing a gas in the second piping 313 on the basis of measurement results of the pressure gauge 317*a* and the flowmeter 317*b*. The second piping 313 is connected to the liquid supplying unit 320 via the liquid supplying valve 319.

The liquid supplying unit 320 supplies the grinding lubricant containing gas bubbles into a grinding apparatus 400. The grinding apparatus 400 includes, for example, a tool 410 such as a grindstone for grinding a workpiece W and a support table 420 for supporting the workpiece W. The liquid supplying unit 320 supplies the liquid L containing gas bubbles into the area between the tool 410 and the workpiece W, for example.

The waste-liquid collecting unit 330 is a configuration for collecting the grinding lubricant L containing gas bubbles supplied into the grinding apparatus 400 as a waste liquid. The waste-liquid collecting unit 330 includes, for example, a container, a water drain port, and the like (not shown) that are disposed below the support table 420.

The waste-liquid collecting line 340 is connected to the waste-liquid collecting unit 330 and supplies the collected grinding lubricant L containing gas bubbles into the storage unit 50. The waste-liquid collecting line 340 includes a third piping 341, a pressure/flow rate adjustment valve 342, and a filter 343. The pressure/flow rate adjustment valve 342 and the filter 343 are connected to the third piping 341. The filter 343 is used for removing impurities from the grinding lubricant flowing the third piping 341 of the waste-liquid collecting line 340.

In the supply system 300 for a liquid containing gas bubbles for a liquid containing gas bubbles having the above-mentioned configuration, the storage unit 50 is first filled with a stock solution that is a grinding lubricant. Then, the production apparatus 100 for a liquid containing gas bubbles is activated. Accordingly, the grinding-lubricant stock solution in the storage unit 50 is changed into the grinding lubricant L containing gas bubbles.

The grinding lubricant L containing gas bubbles, which is generated in the storage unit 50, is supplied into the grinding apparatus 400 from the liquid supplying unit 320 through the liquid supplying line 310. Accordingly, the workpiece W is subjected to grinding using the grinding lubricant L containing gas bubbles.

The used grinding lubricant L containing gas bubbles, which flows out of the support table 420, is supplied into the waste-liquid collecting line 340 via the waste-liquid collecting unit 330. Then, impurities such as grinding chips are removed through the filter 343 of the waste-liquid collecting line 340 and is supplied into the storage unit 50 again.

The production apparatus 100 for a liquid containing gas bubbles is capable of generating minute gas bubbles such as UFB with a high density. Accordingly, the grinding lubricant put in the storage unit 50 can be changed into the grinding lubricant L containing gas bubbles in a short time. Therefore, the time for preparing the grinding lubricant L containing gas bubbles can be shortened and the productivity of the grinding process can be improved.

Moreover, the high-density minute gas bubbles can sufficiently provide the washing effect, the clogging prevention effect, and the like. Therefore, the replacement frequency of the grinding lubricant, the tool, the pipings, and the like can be reduced, and the costs related to the grinding can be reduced.

In addition, since the production apparatus 100 for a liquid containing gas bubbles is placed inside the storage unit 50, the entire system can be downsized. Moreover, the production apparatus 100 for a liquid containing gas bubbles and the reservation container 200 for a liquid containing gas bubbles can be easily introduced into an existing grinding lubricant supply system, and the introduction costs can be reduced.

Moreover, the production apparatus 100 for a liquid containing gas bubbles is compact and low-cost. Therefore, the supply system 300 for a liquid containing gas bubbles for a liquid containing gas bubbles can be flexibly configured in accordance with desired density and the like of minute gas bubbles. For example, the reservation container 200 for a liquid containing gas bubbles may have a configuration including a plurality of production apparatuses 100 for a liquid containing gas bubbles for the single storage unit 50. Accordingly, a large amount of liquid containing high-density gas bubbles can be produced in a short time also in a case where the storage unit 50 is large, for example.

Other Embodiments

For example, ultra-fine bubbles have a variety of effects such as an oxidization suppression effect and a gas supplying effect other than the above-mentioned washing effect. Therefore, the supply system for a liquid containing gas bubbles including the production apparatus for a liquid containing gas bubbles according to the present invention, the storage unit, and the liquid supplying unit can also be used for the following applications.

For example, the supply system for a liquid containing gas bubbles according to the present invention can also be configured as a washing water supply system that washes food products, precision instruments, and the like by using, for example, purified water as the liquid and using, for example, the air or ozone as the gas.

Moreover, the supply system for a liquid containing gas bubbles according to the present invention can also be configured as an oxidization prevention water supply system that inhibits oxidization of fish and meat and the like by using, for example, purified water as the liquid and using, for example, nitrogen as the gas.

Alternatively, the supply system for a liquid containing gas bubbles according to the present invention can also be configured as a supply system for a liquid containing gas bubbles for a bathtub by using, for example, water as the liquid and using, for example, carbon dioxide or the air as the gas. This supply system for a liquid containing gas bubbles may be incorporated in a hot-water supply system or may be connected to the hot-water supply system. Alternatively, using the bathtub main body as the "storage unit" and attaching the production apparatus for a liquid containing gas bubbles to a part of the bathtub, the bathtub may be configured as a reservation container for a liquid containing gas bubbles including the production apparatus for a liquid containing gas bubbles.

Moreover, the supply system for a liquid containing gas bubbles according to the present invention can be configured as a water supply system for culturing aquatic animals such as fishes by using, for example, water or sea water as the liquid and using, for example, oxygen as the gas. Accordingly, oxygen can be sufficiently mixed in the water used for the culture, and the growth of the aquatic animals can be promoted.

Moreover, the supply system for a liquid containing gas bubbles according to the present invention can be configured as a water sprinkle system for plants by using, for example, water or liquid fertilizer as the liquid and using, for example, carbon dioxide or nitrogen as the gas. Accordingly, the plants can be supplied with a liquid containing gas bubbles in which a desired gas is mixed, and the plant growth or the like can be promoted.

Hereinabove, the embodiments of the present invention have been described, though the present invention is not limited only to the above-mentioned embodiments and various modifications can be made as a matter of course without departing from the gist of the present invention. For example, the embodiments can be combined as an embodiment of the present invention.

The flow velocity control unit includes the second choke portion in the above description, though not limited thereto. For example, the flow velocity control unit may include a valve mechanism capable of controlling the flow rate. Also with such a configuration, the flow velocity of the liquid containing gas bubbles can be controlled and cavities can be formed.

The reservation container for a liquid containing gas bubbles may include, other than the production apparatus for a liquid containing gas bubbles and the storage unit, an agitating apparatus that is disposed inside the storage unit, for example. Accordingly, the density of minute gas bubbles in the liquid in the storage unit is made uniform.

Moreover, the pump unit configuration is not limited to the vane pump, and the pump unit may be constituted by another pump mechanism that is capable of causing the liquid containing gas bubbles to collapse and provides a desired discharge pressure.

The invention claimed is:

1. A production apparatus for a liquid containing gas bubbles, comprising:

a casing provided with a main flow channel for a liquid, the main flow channel having a liquid inflow port and a liquid outflow port;

a pump unit that includes a rotor disposed in the main flow channel and rotatably supported by the casing, and that pumps the liquid to the liquid outflow port from the liquid inflow port;

a gas bubble-mixing unit including:

a first choke portion that is disposed in the main flow channel and has an inner diameter decreased; and a gas supply channel that supplies the first choke portion with a gas; and a flow velocity control unit that includes a second choke portion in which an inner diameter of the main flow channel is decreased, is disposed between the pump unit and the liquid outflow port, and controls flow velocity of the liquid containing the gas, wherein the pump unit and the gas bubble-mixing unit are disposed inside the casing, wherein the pump unit is disposed between the gas bubble-mixing unit and the liquid outflow port, and wherein the gas bubble-mixing unit is disposed between the liquid inflow port and the pump unit.

2. The production apparatus for a liquid containing gas bubbles according to claim 1, wherein the pump unit further includes:

a drive unit that is disposed outside the casing and rotates the rotor;

a plurality of vanes provided capable of reciprocation in a radial direction of the rotor;

a cam ring having a cam surface with which leading end portions of the plurality of vanes are brought into contact due to the rotation of the rotor and attached to the casing to define a pump chamber with the rotor and the plurality of vanes;

an inlet port that is in communication with the liquid inflow port and takes the liquid into the pump chamber; and an outlet port that is in communication with the liquid outflow port and discharges the liquid from the pump chamber.

3. The production apparatus for a liquid containing gas bubbles according to claim 1, wherein the second choke portion has:

a small-diameter portion in which the inner diameter of the main flow channel is extremely small; and an increased-diameter portion which is connected to the small-diameter portion and the liquid outflow port and in which the inner diameter of the main flow channel gradually increases.

4. The production apparatus for a liquid containing gas bubbles according to claim 1, wherein the gas bubble-mixing unit includes a rotational flow generation unit that is connected to the liquid inflow port and the first choke portion and generates, in the liquid, a rotational flow around an axis of the main flow channel.

* * * * *